(12) United States Patent
Ye et al.

(10) Patent No.: US 11,516,512 B2
(45) Date of Patent: Nov. 29, 2022

(54) METHOD AND SYSTEM FOR PROCESSING VIDEO CONTENT

(71) Applicant: ALIBABA GROUP HOLDING LIMITED, Grand Cayman (KY)

(72) Inventors: Yan Ye, San Mateo, CA (US); Jie Chen, San Mateo, CA (US); Ru-Ling Liao, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/805,611

(22) Filed: Feb. 28, 2020

(65) Prior Publication Data

US 2020/0288173 A1    Sep. 10, 2020

Related U.S. Application Data

(60) Provisional application No. 62/817,546, filed on Mar. 12, 2019, provisional application No. 62/813,728, filed on Mar. 4, 2019.

(51) Int. Cl.
*H04N 19/61* (2014.01)
*H04N 19/186* (2014.01)
(Continued)

(52) U.S. Cl.
CPC .......... *H04N 19/61* (2014.11); *H04N 19/124* (2014.11); *H04N 19/176* (2014.11); *H04N 19/186* (2014.11)

(58) Field of Classification Search
CPC .. H04N 19/159; H04N 19/513; H04N 19/109; H04N 19/184
See application file for complete search history.

(56) References Cited

U.S. PATENT DOCUMENTS

2009/0245387 A1 * 10/2009 Hvidsten ................... G06T 7/90
 375/E7.027
2013/0010196 A1    1/2013 Payson et al.
(Continued)

FOREIGN PATENT DOCUMENTS

WO    WO2018016381 A1    1/2018
WO    WO-2020069667 A1 *    4/2020    ........... H04N 19/105
WO    WO-2020176459 A1 *    9/2020    ........... H04N 19/132

OTHER PUBLICATIONS

"Extended Cross-Component Prediction in HEVC"—Tung Nguyen, Ali Khairat, Detlev Marpe, Mischa Siekmann, and Thomas Wiegand; 978-1-4799-7783-3/15/$31.00 © 2015 IEEE. (Year: 2015).*
(Continued)

*Primary Examiner* — Mainul Hasan
(74) *Attorney, Agent, or Firm* — Finnegan, Henderson, Farabow, Garrett & Dunner, LLP

(57) ABSTRACT

Methods and systems for performing in-loop luma mapping with chroma scaling are described. One of the methods includes receiving a chrome block and a luma block associated with a picture. The method also includes determining luma scaling information associated with the luma block. The method also includes determining a luma scaling factor of the luma block based on the luma scaling information. The method also includes determining the chroma scaling factor based on a value of the luma scaling factor. The method also includes processing residuals of the chroma block using the chroma scaling factor.

10 Claims, 18 Drawing Sheets

(51) Int. Cl.
*H04N 19/176* (2014.01)
*H04N 19/124* (2014.01)

(56) References Cited

U.S. PATENT DOCUMENTS

| | | | |
|---|---|---|---|
| 2014/0133551 A1 | 5/2014 | Alshina et al. | |
| 2015/0016512 A1* | 1/2015 | Pu | H04N 19/61 |
| | | | 375/240.03 |
| 2015/0117519 A1* | 4/2015 | Kim | H04N 19/105 |
| | | | 375/240.02 |
| 2015/0124865 A1* | 5/2015 | Kim | H04N 19/105 |
| | | | 375/240.12 |
| 2017/0085917 A1 | 3/2017 | Hannuksela | |
| 2017/0105014 A1* | 4/2017 | Lee | H04N 19/85 |
| 2017/0244975 A1 | 8/2017 | Huang et al. | |
| 2018/0176594 A1* | 6/2018 | Zhang | H04N 19/593 |
| 2019/0068969 A1* | 2/2019 | Rusanovskyy | H04N 19/1887 |
| 2019/0191172 A1* | 6/2019 | Rusanovskyy | H04N 19/124 |
| 2019/0289306 A1* | 9/2019 | Zhao | H04N 19/61 |
| 2019/0327477 A1* | 10/2019 | Ramasubramonian | |
| | | | G06T 5/008 |
| 2020/0154115 A1* | 5/2020 | Ramasubramonian | |
| | | | H04N 19/176 |
| 2020/0366910 A1* | 11/2020 | Zhang | H04N 19/159 |
| 2021/0092413 A1* | 3/2021 | Tsukuba | H04N 19/159 |

OTHER PUBLICATIONS

"Adaptive Cross-Component Prediction For 4:4:4 High Efficiency Video Coding"—Ali Khairat, Tung Nguyen, Mischa Siekmann, Detlev Marpe, and Thomas Wiegand; 978-1-4799-575 1-4/14/$31.00 © 2014 IEEE. (Year: 2014).*

G.J. Sullivan, J.R. Ohm, W.J. Han, T. Wiegand, "Overview of the high efficiency video coding (HEVC) standard," IEEE Trans. Circuits and Systems for Video Technology, vol. 22, No. 12, pp. 1649-1668, Dec. 2012.

J. Chen, E. Alshina, G. J. Sullivan, J.-R. Ohm, J. Boyce, "Algorithm description of Joint Exploration Test Model 7 (JEM7)", JVET-G1001, Jul. 2017.

A. Segall, V. Baroncini, J. Boyce, J. Chen, and T. Suzuki, "Joint Call for Proposals on Video Compression with Capability beyond HEVC," JVET-H1002, Oct. 2017.

B. Bross, J. Chen, S. Liu, "Versatile Video Coding (draft 4)", JVET-M1001, Jan. 2019.

J. Chen, Y. Ye, S. Kim, "Algorithm description for Versatile Video Coding and Test Model 4 (VTM 4)," JVET-M1002, Jan. 2019.

T. Lu, F. Pu, P. Yin, W. Husak, S. McCarthy, T. Chen, "CE12: Mapping functions (test CE12-1 and CE12-2)," JVET-M0427, Jan. 2019.

PCT International Search Report and Written Opinion dated May 26, 2020, issued in corresponding International Application No. PCT/US2020/020513 (11 pgs.).

* cited by examiner

Table 1

| tile_group_header( ) { | Descriptor |
|---|---|
| ... | |
|   if ( sps_reshaper_enabled_flag ) { | |
|     tile_group_reshaper_model_present_flag | u(1) |
|     if ( tile_group_reshaper_model_present_flag ) | |
|       tile_group_reshaper_model ( ) | |
|     tile_group_reshaper_enable_flag | u(1) |
|     if ( tile_group_reshaper_enable_flag && (!( qtbtt_dual_tree_intra_flag && tile_group_type == I ) ) ) | |
|       tile_group_reshaper_chroma_residual_scale_flag | u(1) |
|   } | |
|   byte_alignment( ) | |
| } | |

FIG. 6: Tile Group Level Syntax Table for LMCS Piecewise Linear Model

Table 2

| tile_group_reshaper_model ( ) { | Descriptor |
|---|---|
|    reshaper_model_min_bin_idx | ue(v) |
|    reshaper_model_delta_max_bin_idx | ue(v) |
|    reshaper_model_bin_delta_abs_cw_prec_minus1 | ue(v) |
|    for ( i = reshaper_model_min_bin_idx; i <= reshaper_model_max_bin_idx; i++ ) { | |
|      reshape_model_bin_delta_abs_CW [ i ] | u(v) |
|      if ( reshaper_model_bin_delta_abs_CW[ i ] ) > 0 ) | |
|        reshaper_model_bin_delta_sign_CW_flag[ i ] | u(1) |
|    } | |
| } | |

FIG. 7: Tile Group Level Syntax Table for LMCS Piecewise Linear Model

Table 3

| coding_tree_unit( ) { | Descriptor |
|---|---|
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| if( tile_group_sao_luma_flag \|\| tile_group_sao_chroma_flag ) | |
|     sao( xCtb >> CtbLog2SizeY, yCtb >> CtbLog2SizeY ) | |
| if( tile_group_alf_enabled_flag ){ | |
|     alf_ctb_flag[ 0 ][ xCtb >> Log2CtbSize ][ yCtb >> Log2CtbSize ] | ae(v) |
|     if( alf_chroma_idc == 1 \|\| alf_chroma_idc == 3 ) | |
|         alf_ctb_flag[ 1 ][ xCtb >> Log2CtbSize ][ yCtb >> Log2CtbSize ] | ae(v) |
|     if( alf_chroma_idc == 2 \|\| alf_chroma_idc == 3 ) | |
|         alf_ctb_flag[ 2 ][ xCtb >> Log2CtbSize ][ yCtb >> Log2CtbSize ] | ae(v) |
| } | |
| if( ( tile_group_type == I \|\| CurrPicIsOnlyRef ) && qtbtt_dual_tree_intra_flag ) | |
|     dual_tree_implicit_qt_split ( xCtb, yCtb, CtbLog2SizeY, 0 ) | |
| else | |
|     coding_quadtree( xCtb, yCtb, CtbLog2SizeY, 0, SINGLE_TREE ) | |
| } | |

FIG. 8: Coding Tree Unit Syntax Structure

Table 4

| dual_tree_implicit_qt_split( x0, y0, log2CbSize, cqtDepth ) { | Descriptor |
|---|---|
|   if( log2CbSize > 6 ) { | |
|     x1 = x0 + ( 1 << ( log2CbSize − 1 ) ) | |
|     y1 = y0 + ( 1 << ( log2CbSize − 1 ) ) | |
|     dual_tree_implicit_qt_split( x0, y0, log2CbSize − 1, cqtDepth + 1 ) | |
|     if( x1 < pic_width_in_luma_samples ) | |
|       dual_tree_implicit_qt_split( x1, y0, log2CbSize − 1, cqtDepth + 1 ) | |
|     if( y1 < pic_height_in_luma_samples ) | |
|       dual_tree_implicit_qt_split( x0, y1, log2CbSize − 1, cqtDepth + 1 ) | |
|     if( x1 < pic_width_in_luma_samples && y1 < pic_height_in_luma_samples ) | |
|       dual_tree_implicit_qt_split( x1, y1, log2CbSize − 1, cqtDepth + 1 ) | |
|   } else { | |
|     coding_quadtree( x0, y0, log2CbSize, cqtDepth, DUAL_TREE_LUMA ) | |
|     coding_quadtree( x0, y0, log2CbSize, cqtDepth, DUAL_TREE_CHROMA ) | |
|   } | |
| } | |

FIG. 9: Dual Tree Partition Syntax Structure

Table 5

| coding_unit( x0, y0, cbWidth, cbHeight, treeType ) { | Descriptor |
|---|---|
| ... | |
| if( CuPredMode[ x0 ][ y0 ] == MODE_INTRA ) { | |
| .... | |
|    if( treeType == SINGLE_TREE \|\| treeType == DUAL_TREE_CHROMA ) | |
|    { | |
|      intra_chroma_pred_mode[ x0 ][ y0 ] | ae(v) |
|      *if ( tile_group_reshaper_chroma_residual_scale_flag )* | |
|        *lmcs_chroma_scaling_idx[ x0 ][ y0 ]* | *ae(v)* |
|    } | |
|  } | |
| .... | |

FIG. 11: Coding Tree Unit Syntax Structure

Table 6

| tile_group_reshaper_model () { | Descriptor |
|---|---|
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   *reshaper_model_bin_num_unique_cw_minus1* | *ue(v)* |
|   *for ( i = 0; i <= reshaper_model_bin_num_unique_cw_minus1; i++ ) {* | |
|     reshape_model_bin_delta_abs_CW [ i ] | u(v) |
|     if ( reshaper_model_bin_delta_abs_CW[ i ] ) > 0 ) | |
|       reshaper_model_bin_delta_sign_CW_flag[ i ] | u(1) |
|   } | |
|   *for ( i = reshaper_model_min_bin_idx; i <= reshaper_model_max_bin_idx; i++ )* | |
|     *reshaper_model_bin_cw_idx [ i ]* | *u(v)* |
| } | |

FIG. 12: Modified signaling of the LMCS Piecewise Linear Model at Tile Group Level

METHOD AND SYSTEM FOR PROCESSING VIDEO CONTENT

CROSS REFERENCE TO RELATED APPLICATION

The disclosure claims the benefits of priority to U.S. Provisional Application No. 62/813,728, filed Mar. 4, 2019 and U.S. Provisional Application No. 62/817,546, filed Mar. 12, 2019, both of which are incorporated herein by reference in their entireties.

TECHNICAL FIELD

The present disclosure generally relates to video processing, and more particularly, to methods and systems for performing in-loop luma mapping with chroma scaling.

BACKGROUND

Video coding systems are often used to compress digital video signals, for instance to reduce storage space consumed or to reduce transmission bandwidth consumption associated with such signals. With high-definition (HD) videos (e.g., having a resolution of 1920×1080 pixels) gaining popularity in various applications of video compression, such as online video streaming, video conferencing, or video monitoring, it is a continuous need to develop video coding tools that can increase compression efficiency of video data.

For example, video monitoring applications are increasingly and extensively used in many application scenarios (e.g., security, traffic, environment monitoring, or the like), and the numbers and resolutions of the monitoring devices keep growing rapidly. Many video monitoring application scenarios prefer to provide HD videos to users to capture more information, which has more pixels per frame to capture such information. However, an HD video bitstream can have a high bitrate that demands high bandwidth for transmission and large space for storage. For example, a monitoring video stream having an average 1920×1080 resolution can require a bandwidth as high as 4 Mbps for real-time transmission. Also, the video monitoring generally monitors 7×24 continuously, which can greatly challenge a storage system, if the video data is to be stored. The demand for high bandwidth and large storage of the HD videos has therefore become a major limitation to its large-scale deployment in video monitoring.

SUMMARY OF THE DISCLOSURE

Embodiments of the present disclosure provide a method for processing video content. The method can include: receiving a chrome block and a luma block associated with a picture; determining luma scaling information associated with the luma block; determining a chroma scaling factor based on the luma scaling information; and processing the chroma block using the chroma scaling factor.

Embodiments of the present disclosure provide an apparatus for processing video content. The apparatus can include: a memory storing a set of instructions; and a processor coupled to the memory and configured to execute the set of instructions to cause the apparatus to perform: receiving a chrome block and a luma block associated with a picture; determining luma scaling information associated with the luma block; determining a chroma scaling factor based on the luma scaling information; and processing the chroma block using the chroma scaling factor.

Embodiments of the present disclosure provide a non-transitory computer-readable storage medium storing a set of instructions that are executable by one or more processors of a device to cause the device to perform a method for processing video content. The method include: receiving a chrome block and a luma block associated with a picture; determining luma scaling information associated with the luma block; determining a chroma scaling factor based on the luma scaling information; and processing the chroma block using the chroma scaling factor.

BRIEF DESCRIPTION OF THE DRAWINGS

Embodiments and various aspects of this disclosure are illustrated in the following detailed description and the accompanying figures. Various features shown in the figures are not drawn to scale.

FIG. 6 illustrates a tile group level syntax table for LMCS piecewise linear model, according to some embodiments of the disclosure.

FIG. 7 illustrates another tile group level syntax table for LMCS piecewise linear model, according to some embodiments of the disclosure.

FIG. 8 is a table of coding tree unit syntax structure, according to some embodiments of the disclosure.

FIG. 9 is a table of dual tree partition syntax structure, according to some embodiments of the disclosure.

FIG. 11 is a table of coding tree unit syntax structure, according to some embodiments of the disclosure.

FIG. 12 is a table of syntax elements for modified signaling of the LMCS piecewise linear model at tile group level, according to some embodiments of the disclosure.

DETAILED DESCRIPTION

Figure 1:
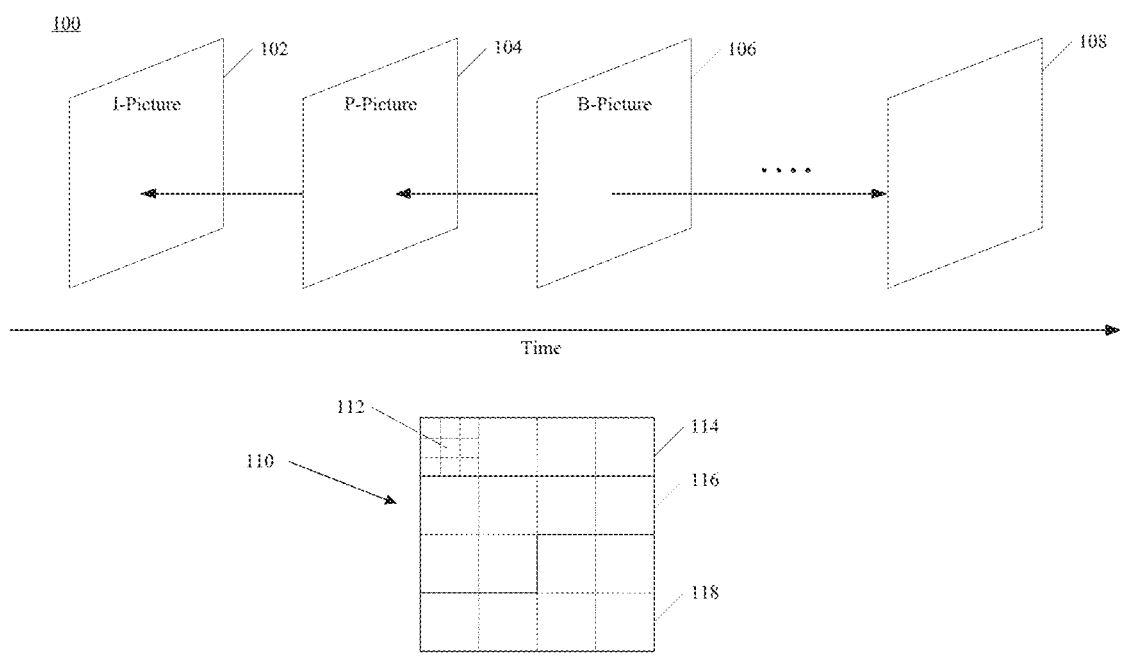
FIG. 1 illustrates structures of an example video sequence, according to some embodiments of this disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for monitoring, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

As previously mentioned, video monitoring that uses HD videos faces challenges of demands of high bandwidth and large storage. For addressing such challenges, the bitrate of the encoded video can be reduced. Among the I-, P-, and B-pictures, I-pictures have the highest bitrate. Because the backgrounds of most monitoring videos are nearly static, one way to reduce the overall bitrate of the encoded video can be using fewer I-pictures for video encoding.

However, the improvement of using fewer I-pictures can be trivial because the I-pictures are typically not dominant in the encoded video. For example, in a typical video bitstream, the ratio of I-, B-, and P-pictures can be 1:20:9, in which the I-pictures can account for less than 10% of the total bitrate. In other words, in such an example, even all I-pictures are removed, the reduced bitrate can be no more than 10%.

This disclosure provides methods, apparatuses, and systems for characteristic-based video processing for video monitoring. A "characteristic" herein refers to a content characteristic associated with video contents in a picture, a motion characteristic associated with motion estimation of encoding or decoding the picture, or both. For example, the content characteristic can be pixels in one or more continuous pictures of a video sequence, the pixels being related to at least one of an object, a scene, or an environmental event in the picture. For another example, the motion characteristic can include information related to the video coding process, examples of which will be detailed later.

In this disclosure, when encoding a picture of a video sequence, a characteristic classifier can be used to detect and classify one or more characteristics of a picture of the video sequence. Different classes of the characteristics can be associated with different priority levels that are further associated with different bitrates for encoding. Different priority levels can be associated with different parameter sets for encoding, which can result in different encoding quality levels. The higher a priority level is, the higher the quality of the video its associated parameter set can result in. By such a characteristic-based video processing, the bitrate can be greatly reduced for the monitoring video without causing significant information loss. In addition, embodiments of this disclosure can customize the corresponding relationships between the priority levels and the parameter sets for different application scenarios (e.g., security, traffic, environment monitoring, or the like), thereby greatly improving the video coding quality and greatly reducing the costs for bandwidth and storage.

FIG. 1 illustrates structures of an example video sequence 100, according to some embodiments of this disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIG. 2A), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which will be detailed in FIG. 2A), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

Figure 2A:
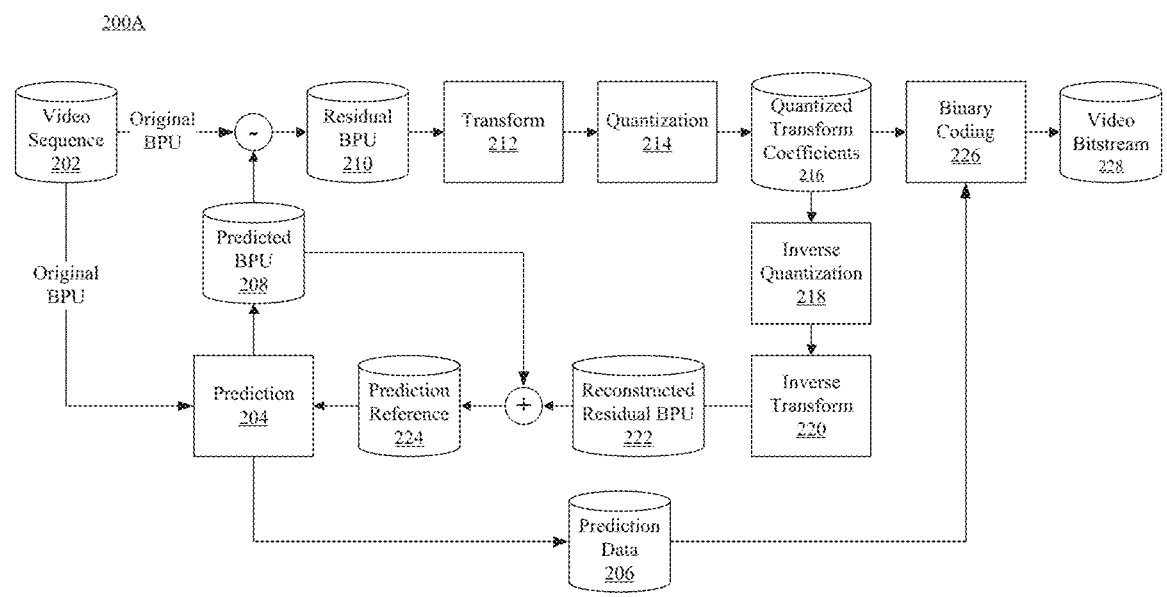
FIG. 2A illustrates a schematic diagram of an example encoding process, according to some embodiments of this disclosure.

FIG. 2A illustrates a schematic diagram of an example encoding process 200A, according to some embodiments of this disclosure. An encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 21Q is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
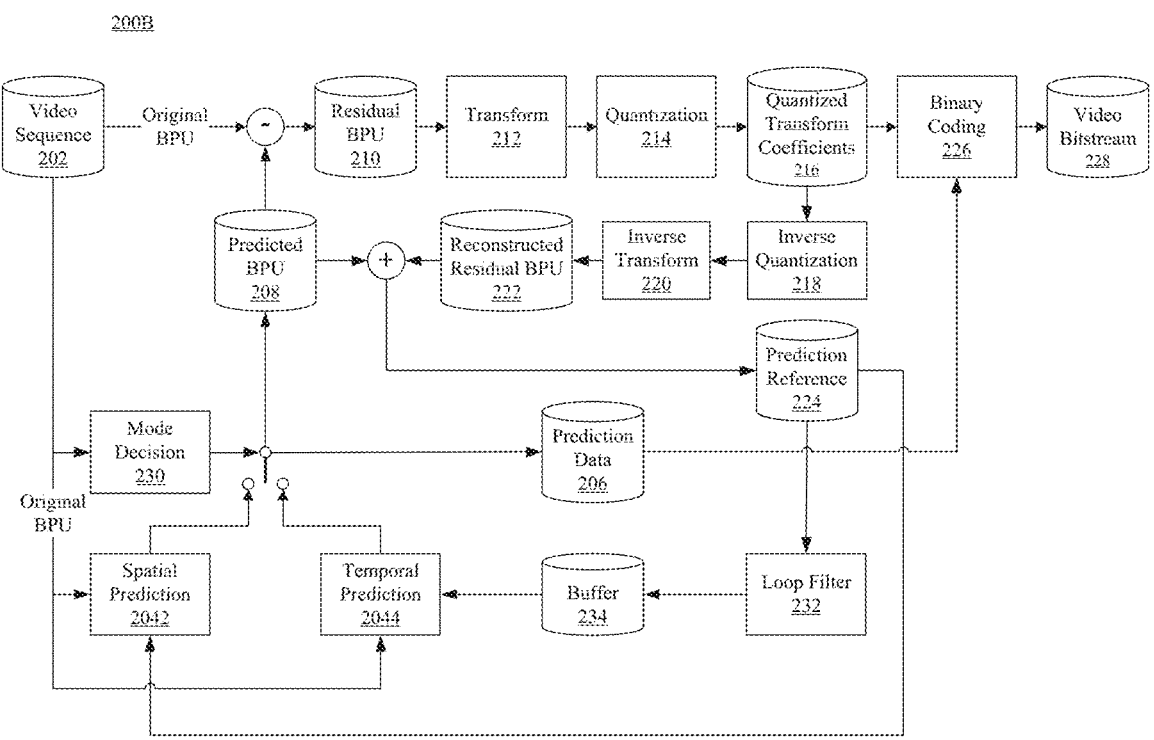
FIG. 2B illustrates a schematic diagram of another example encoding process, according to some embodiments of this disclosure.

FIG. 2B illustrates a schematic diagram of another example encoding process 200B, according to some embodiments of this disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
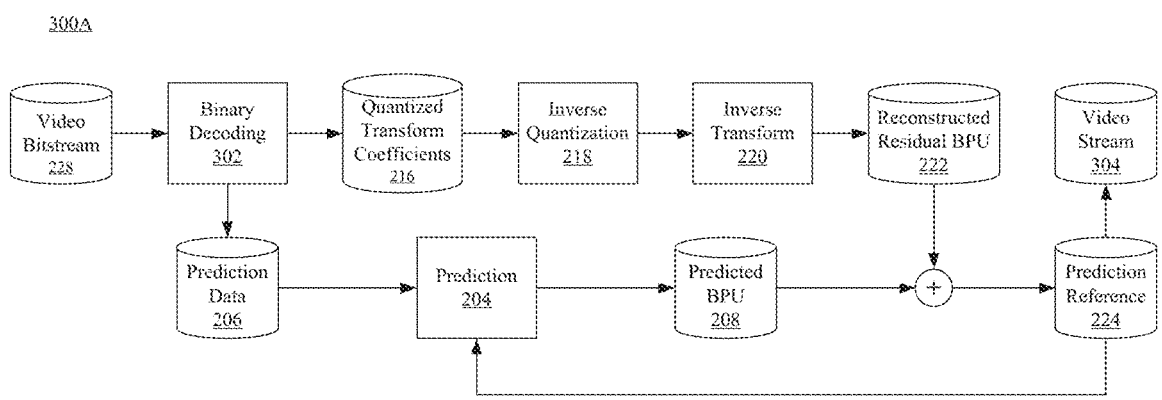
FIG. 3A illustrates a schematic diagram of an example decoding process, according to some embodiments of this disclosure.

FIG. 3A illustrates a schematic diagram of an example decoding process 300A, according to some embodiments of this disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
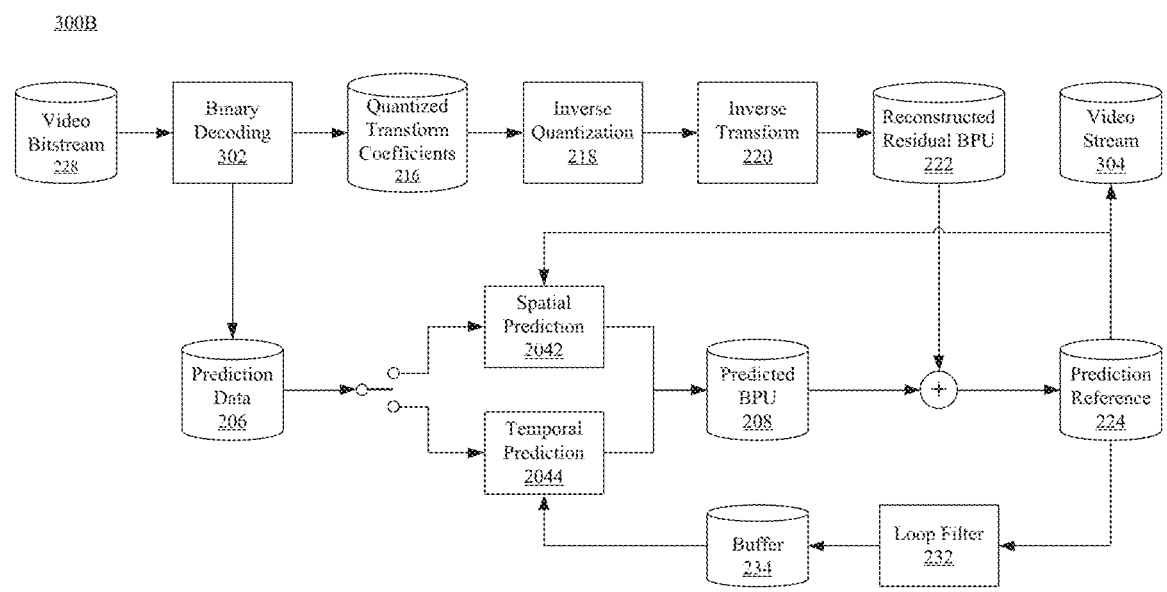
FIG. 3B illustrates a schematic diagram of another example decoding process, according to some embodiments of this disclosure.

FIG. 3B illustrates a schematic diagram of another example decoding process 300B, according to some embodiments of this disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can, include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
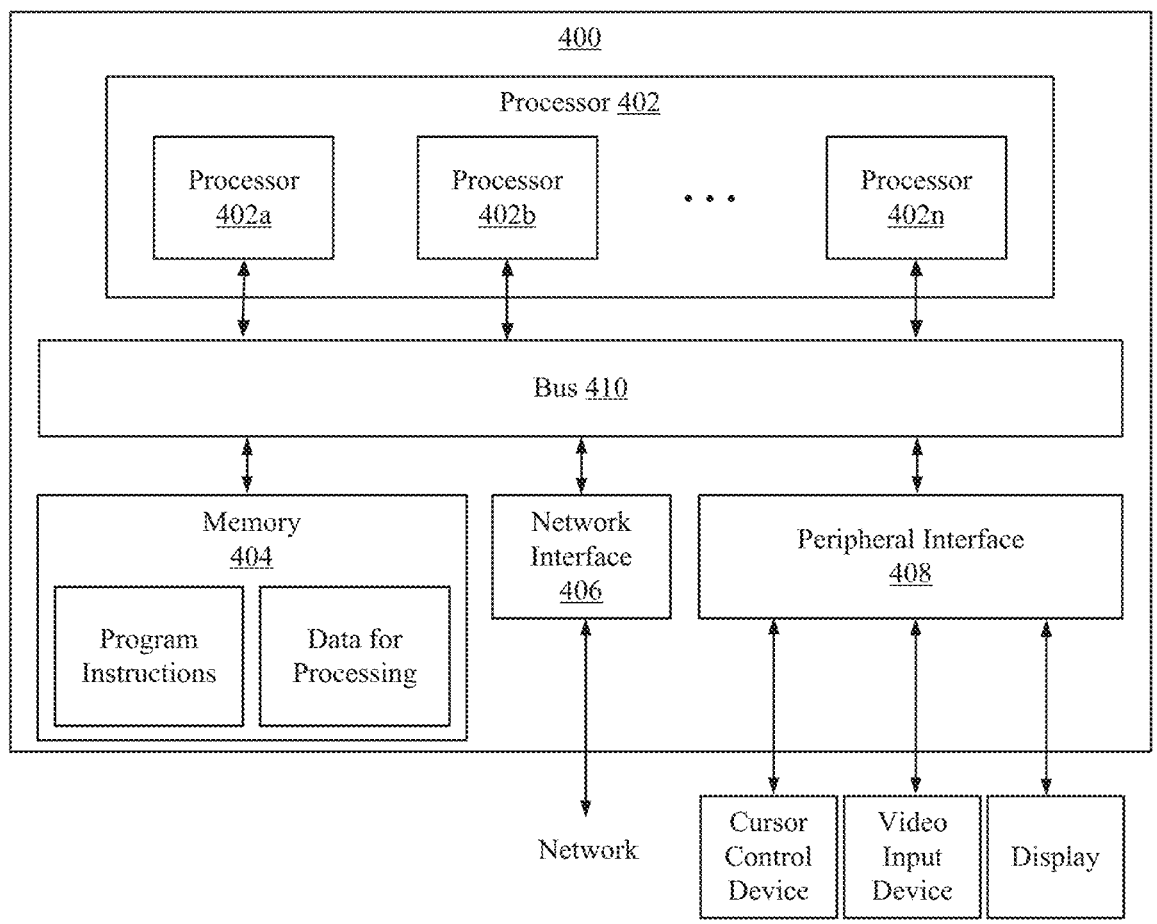
FIG. 4 illustrates a block diagram of an example apparatus for encoding or decoding a video, according to some embodiments of this disclosure.

FIG. 4 is a block diagram of an example apparatus 400 for encoding or decoding a video, according to some embodiments of this disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
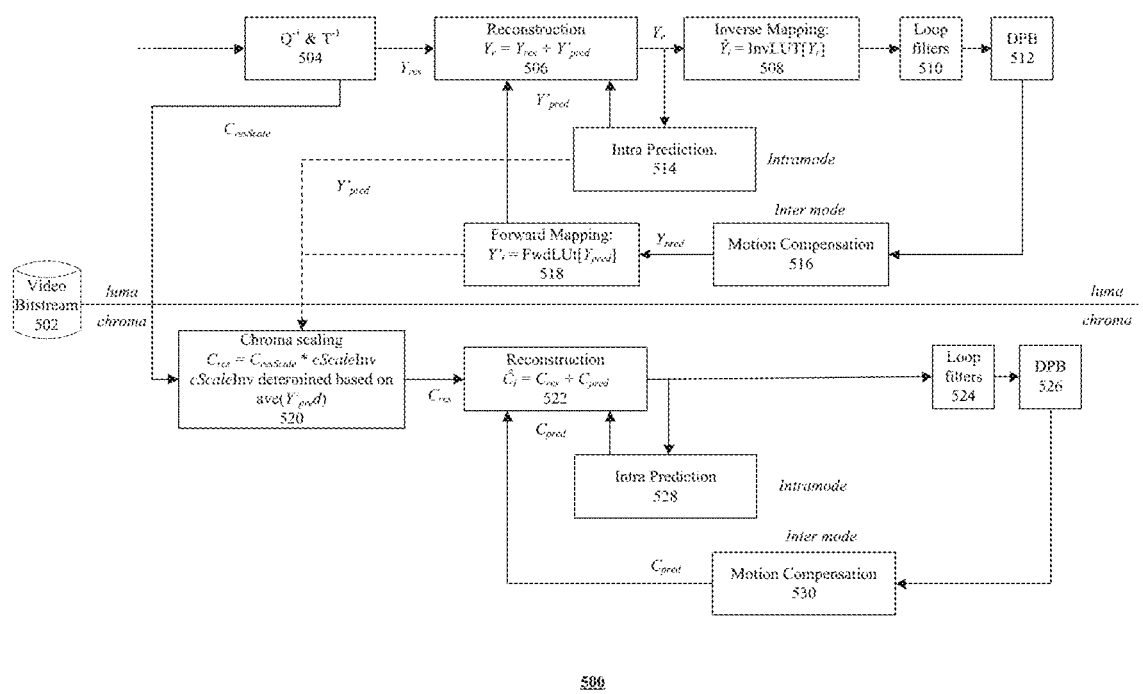
FIG. 5 illustrates a schematic diagram of an exemplary luma mapping with chroma scaling (LMCS) process, according to some embodiments of the disclosure.

FIG. 5 illustrates a schematic diagram of an exemplary luma mapping with chroma scaling (LMCS) process 500, according to some embodiments of the disclosure. For example, process 500 can be used by a decoder conforming to a hybrid video coding standard (e.g., H.26x series). The LMCS is a new processing block applied before loop filter 232 of FIG. 2B. The LMCS can also be referred to as a reshaper.

LMCS process 500 can include an in-looping mapping of the luma component values based on an adaptive piecewise linear model and a luma-dependent chroma residual scaling of the chroma components.

As shown in FIG. 5, the in-looping mapping of the luma component values based on an adaptive piecewise linear model can include a forward mapping stage 518 and an inverse mapping stage 508. The luma-dependent chroma residual scaling of the chroma components can include chroma scaling 520.

Sample values before mapping or after inverse mapping can be referred to as samples in the original domain, and sample values after mapping and before inverse mapping can be referred to as samples in the mapped domain. Some stages in process 500 can be performed in the mapped domain instead of the original domain, when LMCS is enabled. It is appreciated that forward mapping stage 518 and inverse mapping stage 508 can be enabled/disabled at the sequence level using an SPS flag.

As shown in FIG. 5, $Q^{-1}\&T^{-1}$ stage 504, reconstruction 506, and intra prediction 508 are performed in the mapped domain. For example, $Q^{-1}\&T^{-1}$ stage 504 can include inverse quantization and inverse transform, reconstruction 506 can include addition of the luma prediction and the luma residual, and intra prediction 508 can include luma intra prediction.

Loop filters 510, motion compensation stages 516 and 530, intra prediction stage 528, reconstruction stage 522, and decoded picture buffer (DPB) 512 and 526 are performed in the original (i.e., non-mapped) domain. In some embodiments, loop filters 510 can include deblocking, an adaptive loop filter (ALF), and sample adaptive offset (SAO), reconstruction stage 522 can include addition of the chroma prediction together with the chroma residual, and DPB 512 and 526 can store decoded pictures as reference pictures.

In some embodiments, luma mapping with a piecewise linear model can be applied.

The in-loop mapping of the luma component can adjust the signal statistics of the input video by redistributing the codewords across the dynamic range to improve compression efficiency. Luma mapping can be performed by a forward mapping function "FwdMap" and a corresponding inverse mapping function "InvMap." The "FwdMap" function is signaled using a piecewise linear model with 16 equal pieces. "InvMap" function does not need to be signaled and is instead derived from the "FwdMap" function.

Signaling of the piecewise linear model is shown in Table 1 of FIG. 6 and Table 2 of FIG. 7. Table 1 of FIG. 6 illustrates a tile group header syntax structure. As shown in FIG. 6, a reshaper model parameter presence flag is signaled to indicate if the luma mapping model is present in the current tile group. If luma mapping model is present in the current tile group, corresponding piecewise linear model parameters can be signaled in tile_group_reshaper_model( ), using the syntax elements shown in Table 2 of FIG. 7. The piecewise linear model partitions a dynamic range of the input signal into 16 equal pieces. For each of the 16 equal pieces, linear mapping parameters of the piece are expressed using the number of codewords assigned to the piece. Take 10-bit input as an example. Each of the 16 pieces can have 64 codewords assigned to the piece by default. The signaled number of codewords can be used to calculate the scaling factor and adjust the mapping function accordingly for the piece. Table 2 of FIG. 7 also defines a minimum index "reshaper_model_min_bin_idx" and a maximum index "reshaper_model_maxbin_idx" for which numbers of codewords are signaled, inclusively. If the piece index is smaller than reshaper_model_min_bin_idx or larger than reshaper_model_max_bin_idx, then the number of codewords for that piece is not signaled, and is inferred to be zero (i.e., no codewords are assigned and no mapping/scaling is applied to that piece).

After tile_group_reshaper_model( ) is signaled, at the tile group header level, another reshaper enable flag "tile_group_reshaper_enable_flag" is signaled to indicate if the LMCS process as depicted in FIG. 8 is applied to the current tile group. If a reshaper is enabled for the current tile group and if the current tile group does not use dual tree partition, then a further chroma scaling enable flag is signaled to indicate if chroma scaling is enable for the current tile group or not. Dual tree partition can also be referred to as chroma separate tree.

The piecewise linear model can be constructed based on the signaled syntax elements in Table 2 of FIG. 7 as follows. Each i-th piece, i=0, 1, . . . , 15 of the "FwdMap" piecewise linear model is defined by two input pivot points InputPivot[ ] and two output (mapped) pivot points MappedPivot[ ]. The InputPivot[ ] and MappedPivot[ ] are computed based on the signaled syntax as follows (without loss of generality, we assume the bit depth of the input video is 10-bit):

1) OrgCW=64
2) For i=0:16, InputPivot[i]=i*OrgCW
3) For i=reshaper model_min_bin_idx: reshaper_model_max_bin_idx, SignaledCW[i]=OrgCW+(1¬2*reshape_model_bin_delta_sign_CW [i])*reshape_model_bin_delta_abs_CW [i];
4) For i=0:16, MappedPivot[i] is calculated as follows:
    MappedPivot[0]=0;
    for (i=0; i<16; i++)
        MappedPivot[i+1]=MappedPivot[i]+SignaledCW[i]

The inverse mapping function "InvMap" can be also defined by InputPivot[ ] and MappedPivot[ ]. Different from "FwdMap," for the "InvMap" piecewise linear model, the two input pivot points of each piece can be defined by MappedPivot[ ] and the two output pivot points can be defined by InputPivot[ ], which is the opposite of "FwdMap." In this way, the input of the "FwdMap" is partitioned into equal pieces, but the input of the "InvMap" is not guaranteed to be partitioned into equal pieces.

As shown in FIG. 5, for an inter-coded block, motion compensated prediction can be performed in the mapped domain. In other words, after the motion-compensated prediction 516, $Y_{pred}$ is calculated based on the reference signals in the DPB, the "FwdMap" function 518 can be applied to map the luma prediction block in the original domain to the mapped domain, $Y'_{pred}$=FwdMap($Y_{pred}$). For an intra-coded block, the "FwdMap" function is not applied because the reference samples used in intra prediction are already in the mapped domain. After reconstructed block 506, $Y_r$ can be calculated. The "InvMap" function 508 can be applied to convert the reconstructed luma values in the mapped domain back to the reconstructed luma values in the original domain ($\hat{Y}_i$=InvMap($Y_r$)). The "InvMap" function 508 can be applied to both intra- and inter-coded luma blocks.

The luma mapping process (forward or inverse mapping) can be implemented using either look-up-tables (LUT) or using on-the-fly computation. If LUT is used, then tables "FwdMapLUT[ ]" and "InvMapLUT[ ]" can be pre-calculated and pre-stored for use at the tile group level, and forward and inverse mapping can be simply implemented as FwdMap($Y_{pred}$)=FwdMapLUT[$Y_{pred}$] and InvMap($Y_r$)=InvMapLUT[$Y_r$], respectively. Alternatively, on-the-fly computation can be used. Take forward mapping function "FwdMap" as an example. In order to determine a piece to which a luma sample belongs, the sample value can be right shifted by 6 bits (which corresponds to 16 equal pieces assuming 10-bit video) to obtain the piece index. Then, the linear model parameters for that piece are retrieved and applied on-the-fly to compute the mapped luma value. The FwdMap function is evaluated as follows:

$$Y'_{pred}=\text{FwdMap}(Y_{pred})=((b2-b1)/(a2-a1))*(Y_{pred}-a1)+b1$$

wherein "i" is the piece index, a1 is InputPivot[i], a2 is InputPivot[i+1], b1 is MappedPivot[i], b2 is MappedPivot[i+1].

The "InvMap" function can be computed on-the-fly in a similar manner, except that conditional checks need to be applied instead of a simple right bit-shift when figuring out the piece to which the sample value belongs, because the pieces in the mapped domain are not guaranteed to be equal sized.

In some embodiments, luma-dependent chroma residual scaling can be performed.

Chroma residual scaling is designed to compensate for the interaction between the luma signal and its corresponding chroma signals. Whether chroma residual scaling is enabled or not is also signaled at the tile group level. As shown in Table 1 of FIG. 6, if luma mapping is enabled and if dual tree partition is not applied to the current tile group, an additional flag (e.g., tile_group_reshaper_chroma_residual_scale_flag) is signaled to indicate if luma-dependent chroma residual scaling is enabled or not. When luma mapping is not used or when dual tree partition is used in the current tile group, luma-dependent chroma residual scaling is automatically disabled. Further, luma-dependent chroma residual scaling can be disabled for the chroma blocks whose area is less than or equal to 4.

Chroma residual scaling depends on the average value of the corresponding luma prediction block (for both intra- and inter-coded blocks). avgY' as the average of the luma prediction block can be computed as below:

$$avgY' = \frac{\sum_{i=0}^{width-1} \sum_{j=0}^{height-1} predSamples[i][j]}{width*height}.$$

The value of $C_{scaleInv}$ is computed in the following steps:
1) Find the index $Y_{Idx}$ of the piecewise linear model to which avgY' belongs based on the InvMap function.
2) $C_{ScaleInv}$=cScaleInv[$Y_{Idx}$], where cScaleInv[ ] is a pre-computed 16-piece LUT.

In the current LMCS method in VTM4, the pre-computed LUT cScaleInv[i] with i in the range of 0 to 15 is derived as follows, based on a 64-entry static LUT ChromaResidualScaleLut and the SignaledCW[i] value:
   ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 1024};

shiftC=11
   if (SignaledCW [i]==0)
      cScaleInv [i]=(1<<shiftC)
   Otherwise,
      cScaleInv [i]=ChromaResidualScaleLut[(SignaledCW [i]>>1)−1]

The static table ChromaResidualScaleLut[ ] contains 64 entries, and SignaledCW[ ] is in the range of [0, 128] (assuming the input is 10-bit). Therefore, a divide by 2 (e.g., right shift by 1) is used to construct the chroma scaling factor LUT cScaleInv [ ]. The chroma scaling factor LUT cScaleInv [ ] can contain a plurality of chroma scaling factors. The LUT cScaleInv [ ] is constructed at the tile group level.

If the current block is coded using intra, CIIP, or intra block copy (IBC, also known as current picture referencing or CPR) mode, avgY' is computed as the average of the intra-, CIIP-, or IBC-predicted luma values. Otherwise, avgY' is computed as the average of the forward mapped inter predicted luma values (that is, $Y'_{pred}$ in FIG. 5). Unlike luma mapping, which is performed on the sample basis, $C_{ScaleInv}$ is a constant value for the entire chroma block. With $C_{ScaleInv}$ chroma residual scaling is applied at the decoder side as follows:

Decoder side: $\hat{C}_{Res} = \hat{C}_{ResScale} * C_{ScaleInv}$

Where $\hat{C}_{ResScale}$ is the reconstructed chroma residual of the current block. At the encoder side, the forward chroma residual scaling (before being transformed and quantized) is performed as follows:

Encoder side: $C_{ResScale} = C_{Res} * C_{Scale} = C_{Res}/C_{ScaleInv}$

In some embodiments, dual tree partition can be performed.

In VVC draft 4, the coding tree scheme supports the ability for the luma and chroma to have separate block tree partitions. This is also called dual tree partition. Dual tree partition signaling is shown in Table 3 of FIG. 8 and Table 4 of FIG. 9. When "qtbtt_dual_tree_intra_flag," which is a sequence level control flag signaled in the SPS, is turned on and when the current tile group is intra coded, block partition information can be signaled first for luma and then for chroma, separately. For inter coded tile groups (P and B tile groups), dual tree partition is not allowed. When separate block tree mode is applied, luma coding tree block (CTB) is partitioned into CUs by one coding tree structure, and the chroma CTBs are partitioned into chroma CUs by another coding tree structure, as shown in Table 4 of FIG. 9.

When luma and chroma are allowed to have different partitions, problems may arise for coding tools that have dependency between the different color components. For example, in the case of LMCS, the average value of the corresponding luma block is used in order to figure out the scaling factor to be applied to the current block. When dual tree is used, this could create a latency of an entire CTU. For example, if the luma block of the CTU is split vertically once, and the chroma block of the CTU is split horizontally once, then both of the luma blocks of the CTU are decoded (so that average value can be calculated, which is needed for calculating the chroma scaling factor) before the first chroma block of the CTU can be decoded. In VVC, the CTU can be as large as 128×128 in units of luma samples. Such large latency can be very problematic for hardware decoder pipeline design. Therefore, VVC draft 4 can prohibit the combination of dual tree partition and luma-dependent chroma scaling. When dual tree partition is enabled for the current tile group, chroma scaling can be forced to be off.

Note that the luma mapping part of LMCS is still allowed in dual tree case, as it operates only on the luma component and doesn't have cross color component dependency problem. Another example of a coding tool that relies on the dependency between the color components to achieve better coding efficiency is called the cross component linear model (CCLM).

Thus, derivation of the tile group level chroma scaling factor LUT cScaleInv[ ] is not easily extensible. The derivation process currently depends on a constant chroma LUT ChromaResidualScaleLut with 64 entries. For 10-bit video with 16 pieces, an additional step of division by 2 must be applied. When the number of pieces changes, for example, if 8 instead of 16 pieces is used, then the derivation process must be changed to apply a division by 4 instead of division by 2. This additional step not only causes precision loss, but also is awkward and unnecessary.

Also, in order to calculate the piece index of the current chroma block $Y_{Idx}$, which is used to obtain the chroma scaling factor, an average value of the entire luma block can used. This is undesirable and most likely unnecessary. Consider the maximum CTU size of 128×128. In this case, the average luma value is calculated based on 16384 (128×128) luma samples, which is complex. Further, if a luma block partition of 128×128 is selected by the encoder, that block is more likely to contain homogenous content. Therefore, a subset of the luma samples in the block may be sufficient for calculating the luma average.

In dual tree partition, the chroma scaling can be off to avoid potential pipeline issues for hardware decoders. However, this dependency can be avoided if explicit signaling is used to indicate the chroma scaling factor to be applied, instead of using the corresponding luma samples to derive it. Enabling chroma scaling in intra coded tile groups can further improve coding efficiency.

The signaling of the piecewise linear parameter can be further improved. Currently a delta codeword value is signaled for each of the 16 pieces. It has been observed that often only a limited number of different codewords is used for the 16 pieces. Therefore, signaling overhead can be further reduced.

[01.15] Embodiments of the disclosure provide a method for processing video content by removing chroma scaling LUT.

As mentioned above, the extension of the chroma LUT of 64 entries can be difficult and can be problematic when other piecewise linear models are used (e.g., 8 pieces, 4 pieces, 64 pieces, and the like.) It is also unnecessary because the chroma scaling factor can be set the same as the luma scaling factor of that corresponding piece to achieve the same coding efficiency. In some embodiments of this disclosure, the chroma scaling factor "chroma_scaling" can be determined based on a piece index of the current chroma block "$Y_{Idx}$" as below.

if $Y_{Idx}$>reshaper_model_max_bin_idx, $Y_{Idx}$<reshaper_model_min_bin_idx, or if SignaledCW [$Y_{Idx}$]=0, then set chroma_scaling to default, chroma_scaling=1.0.
   Otherwise, set chroma_scaling to SignaledCW[$Y_{Idx}$]/OrgCW.
   When chroma_scaling=1.0, no scaling is applied.

The chroma scaling factor determined above can have fractional precision. It is appreciated that fixed point approximation can be applied to avoid dependency on hardware/software platforms. Also, at the decoder side, inverse chroma scaling can be performed. Thus, division can be implemented by fixed point arithmetic using multiplication followed by right shift. The inverse chroma scaling factor in fixed point precision "inverse_chroma_scaling[ ]" can be determined based on a number of bits in the fixed point approximation "CSCALE_FP_PREC" as below.

$$\text{inverse\_chroma\_scaling}[Y_{Idx}] = ((1 << (\text{luma\_bit\_depth} - \log 2(\text{TOTAL\_NUMBER\_PIECES}) + \text{CSCALE\_FP\_PREC})) + (\text{SignaledCW}[Y_{Idx}] >> 1))/\text{SignaledCW}[Y_{Idx}];$$

where luma_bit_depth is the luma_bit_depth, TOTAL_NUMBER_PIECES is a total number of pieces in the piecewise linear model, which is set to 16 in VVC draft 4. It is appreciated that values of "inverse_chroma_scaling[ ]" may only need to be calculated once per tile group, and the division in the above is an integer division operation.

Further quantization can be applied to determine the chroma scaling and inverse scaling factor. For example, the inverse chroma scaling factor can be calculated for all the even (2×m) values of "SignaledCW," and the odd (2×m+1) values of the "SignaledCW" reuses the chroma scaling factor of the neighboring even value's scaling factor. In other words, the following may be used:

```
for(i = reshaper_model_min_bin_idx; i <= reshaper_model_
max_bin_idx; i++)
{
  tempCW = SignaledCW[i] >> 1)<<1;
  inverse chroma scaling[i] = ((1 << (luma bit depth - log2
  (TOTAL_NUMBER_PIECES)
  + CSCALE_FP_PREC)) + (tempCW >> 1)) / tempCW;
}
```

Quantizing the chroma scaling factors can be further generalized. For example, the inverse chroma scaling factor "inverse_chroma_scaling[ ]" can be calculated for every n-th value of "SignaledCW," with all other neighboring values sharing the same chroma scaling factor. For example, "n" can be set to 4. Therefore, every 4 neighboring codeword values can share a same inverse chroma scaling factor value. In some embodiments, the value of "n" can be a power of 2, which allows shifting to be used to calculate division. Denote the value of log 2(n) as LOG 2_n, the above equation "tempCW=SignaledCW[i]>>1)<<1" can be modified as follows:

$$\text{tempCW} = \text{SignaledCW}[i] >> \text{LOG 2\_n}) << \text{LOG 2\_n}.$$

In some embodiments, the value of LOG 2_n may be a function of the number of pieces used in the piecewise linear model. It can be beneficial to use a larger LOG 2_n if fewer pieces are used. For example, LOG 2_n can be set to 1+(4−log 2(TOTAL_NUMBER_PIECES)) if the value of TOTAL_NUMBER_PIECES is smaller or equal to 16. If TOTAL_NUMBER_PIECES is larger than 16, then LOG 2_n can be set to 0.

Embodiments of the disclosure provide a method for processing video content by simplifying the averaging of luma prediction block.

As discussed above, to determine a piece index of the current chroma block "$Y_{Idx}$," the average value of the corresponding luma block can used. However, for large block sizes, the averaging process can involve a large number of luma samples. In a worst case, 128×128 luma samples can be involved in the averaging process.

Embodiments of the disclosure provide a simplified averaging process to reduce the worst case to only using N×N luma samples (N is a power of 2).

In some embodiments, if not both dimensions of a two-dimensional luma block are less than or equal to a preset threshold M (in other words, at least one of the two dimension is larger than M,) a "downsampling" can be applied to use only M positions in that dimension. Without loss of generality, take the horizontal dimension as an example. If width is larger than M, then only samples at position x, x=i×(width>>log 2(M)), i=0, . . . M−1, are used in averaging.

Figure 10:
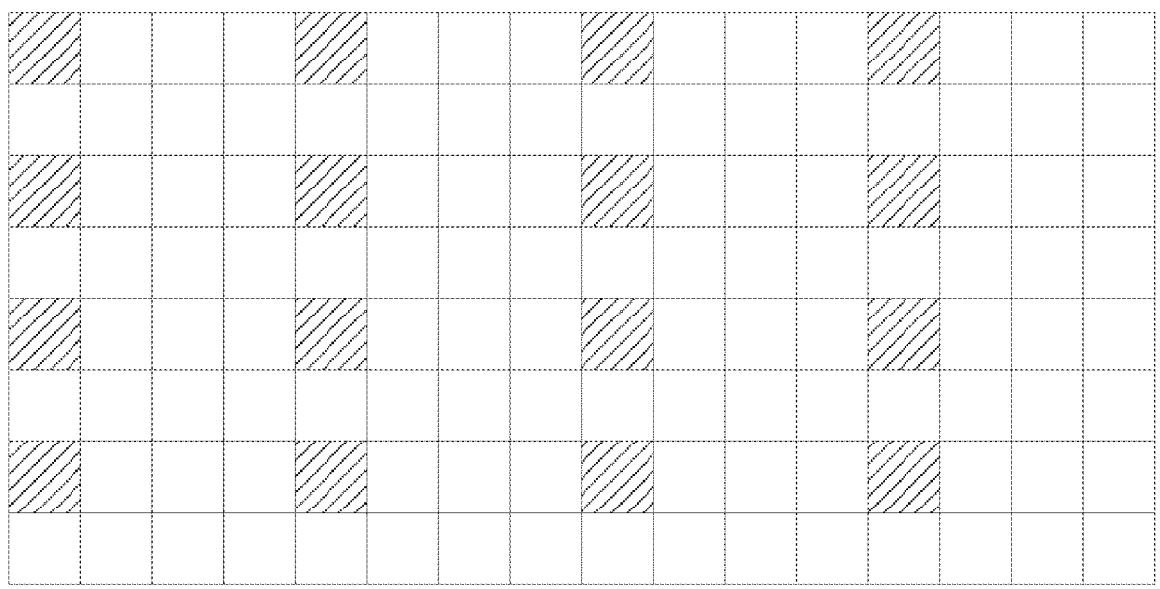
FIG. 10 illustrates an example of simplifying averaging of luma prediction block, according to some embodiments of the disclosure.

FIG. 10 illustrates an example of applying the proposed simplification to calculate the average of a 16×8 luma block. In this example, M is set to 4, and only 16 luma samples (the shaded samples) in the block are used in averaging. It is appreciated that the preset threshold M is not limited to 4, and M can be set to be any values that are powers of 2. For example, the preset threshold M can be 1, 2, 4, 8, and the like.

In some embodiments, the horizontal dimension and the vertical dimension of a luma block can have different preset thresholds M. In other words, the worst case of the averaging operation can use M1×M2 samples.

In some embodiments, the number of samples can be limited in the averaging process without considering the dimension. For example, a maximum of 16 samples may be used, which may be distributed in the horizontal or vertical dimension in the form of 1×16, 16×1, 2×8, 8×2, or 4×4, and whichever form fits the current block's shape can be selected. For example, a matrix of 2×8 samples can be used if the block is narrow and tall, a matrix of 8×2 samples can be used if the block is wide and short, and a matrix of 4×4 samples can be used if the block is square.

It is appreciated that when a large block size is selected, the content within the block tends to be more homogeneous. Thus, although the above simplification can cause difference between the average value and the true average of the entire luma block, such difference can be small.

Moreover, the decoder-side motion vector refinement (DMVR) requires the decoder to perform motion search to derive the motion vector, before motion compensation can be applied. Therefore, the DMVR mode can be complicated in the VVC standard, especially for the decoder. The bi-directional optical flow (BDOF) mode in the VVC standard can further complicate the situation, because BDOF is an additional sequential process that needs to be applied after DMVR, in order to obtain the luma prediction block. Because chroma scaling requires the average value of the corresponding luma prediction block, DMVR and BDOF can be applied before the average value can be calculated.

To solve this latency issue, in some embodiments of this disclosure, the luma prediction block is used before DMVR and BDOF to calculate the average luma value, and the average luma value is used to obtain the chroma scaling factor. This allows chroma scaling to be applied in parallel to the DMVR and BDOF processes, and therefore can significantly reduce latency.

Consistent with the present disclosure, variations of the latency reduction can be contemplated. In some embodiments, this latency reduction can also be combined with the simplified averaging process discussed above that uses only a portion of the luma prediction block to calculate the average luma value. In some embodiments, the luma prediction block can be used after the DMVR process and before the BDOF process to calculate the average luma value. The average luma value is then used to obtain the chroma scaling factor. This design allows chroma scaling to be applied in parallel to the BDOF process while keeping the accuracy of determining the chroma scaling factor. Since the DMVR process may refine the motion vector, using the prediction sample with the refined motion vector after the DMVR process may be more accurate than using the prediction sample with the motion vector before the DMVR process.

Moreover, in the VVC standard, the CU syntax structure "coding_unit( )" includes a syntax element "cu_cbf" to indicate if there is any non-zero residual coefficients in the current CU. At the TU level, the TU syntax structure "transform_unit( )" includes syntax elements "tu_cbf_cb" and "tu_cbf_cr" to indicate if there is any non-zero chroma (Cb or Cr) residual coefficients in the current TU. Conventionally, in the VVC draft 4, the averaging of the corresponding luma block is always invoked if chroma scaling is enabled at the tile group level.

Embodiments of the disclosure further provide a method for processing video content by bypassing the luma averaging process. Consistent with the disclosed embodiments, since the chroma scaling process is applied to the residual chroma coefficients, the luma averaging process can be bypassed if there is no non-zero chroma coefficients. This can be determined based on the following conditions:

Condition 1: cu_cbf is equal to 0
Condition 2: tu_cbf_cr and tu_cbf_cb are both equal to 0

As discussed above, "cu_cbf" can indicate whether there is any non-zero residual coefficients in the current CU, and "tu_cbf_cb" and "tu_cbf_cr" can indicate whether there is any non-zero chroma (Cb or Cr) residual coefficients in the current TU. When either Condition 1 or Condition 2 is met, the luma averaging process can be bypassed.

In some embodiments, only N×N samples of the prediction block are used to derive the average value, which simplifies the averaging process. For example, when N is equal to 1, only the top left sample of the prediction block is used. However, this simplified averaging processing using the prediction block still requires the prediction block to be generated, thereby causing latency.

In some embodiments, the reference luma samples can be used directly to generate the chroma scaling factor. This allows the decoder to derive the scaling factor in parallel to the luma prediction process, therefore reducing latency. Below will describe the intra prediction and inter prediction using the reference luma samples, separately.

In exemplary intra prediction, the decoded neighboring samples in the same picture can be used as the reference samples to generate the prediction block. These reference samples can include e.g., samples on the top of the current block, to the left of the current block, or to the top-left of the current block. The average of these reference samples can be used to derive the chroma scaling factor. In some embodiments, the average of part of these reference samples can be used. For example, only K reference samples (e.g., K=3) closest to the top-left position of the current block are averaged.

In exemplary inter prediction, reference samples from temporal reference pictures can be used to generate the prediction block. These reference samples are identified by the reference picture indices and the motion vectors. Interpolation may be applied if the motion vectors have fractional precision. the reference samples used for determining the average of reference samples can include reference samples before or after interpolation. The reference samples before interpolation can include motion vectors that are clipped to integer precision. Consistent with the disclosed embodiments, all of the reference samples can be used to calculate the average. Alternatively, only a portion of the reference samples (e.g., reference samples corresponding to the top-left position of the current block) can be used to calculate the average.

As shown in FIG. 5, intra prediction (e.g., intra prediction 514 or 528) can be performed in the reshaped domain, while inter prediction is performed in the original domain. Therefore, for inter prediction, a forward mapping can be applied on the prediction block, and the luma prediction block after forward mapping is used to calculate the average. To reduce latency, the average can be calculated using the prediction block before forward mapping. For example, a block before forward mapping, a N×N portion of the block before forward mapping, or the top-left sample of the block before forward mapping can be used.

Embodiments of the present disclosure further provide a method for processing video content with chroma scaling for dual-tree partitions.

Because the dependency on luma can cause hardware design complications, chroma scaling can be turned off for intra-coded tile groups that enable dual-tree partitions. However, this restriction can cause coding efficiency loss. Instead of averaging the sample values of the corresponding luma block to calculate avgY', determining the piece index $Y_{Idx}$ and obtaining the chroma scaling factor inverse_chroma_scaling[$Y_{Idx}$], the chroma scaling factor can be explicitly signaled in the bitstream to avoid the dependency on luma in the case of dual tree partition.

The chroma scaling index may be signaled at different levels. For example, the chroma scaling index can be signaled at the coding unit (CU) level, together with the chroma prediction mode, as shown in Table 5 of FIG. 11. The syntax element "lmcs_scaling_factor_idx" can be used to determine the chroma scaling factor for the current chroma block. When "lmcs_scaling_factor_idx" is not present, the chroma scaling factor for the current chroma block can be inferred to be equal to 1.0 in floating point precision or equivalently (1<<CSCALE_FP_PREC) in fixed point precision. The range of allowed values for "lmcs_chroma_scaling_idx" is determined at tile group level, and will be discussed later.

Depending on the possible values of "lmcs_chroma_scaling_idx," the signaling cost can be high, especially for small blocks. Therefore, in some embodiments of this disclosure, the signaling condition in Table 5 of FIG. 11 can additionally include block size conditions. For example, this syntax element "lmcs_chroma_scaling_idx" (emphasized in italics and gray shading) can only be signaled if the current block contains more than a given number of chroma samples or if the current block has a width larger than a given width W or a height larger than a given height H. For smaller blocks, if the "lmcs_chroma_scaling_idx" is not signaled, then its chroma scaling factor can be determined at the decoder side. In some embodiments, the chroma scaling factor can be set to 1.0 in floating point precision. In some embodiments, a default "lmcs_chroma_scaling_idx" value can be added at the tile group header level (see Table 1 of FIG. 6). Small blocks that don't have signaled "lmcs_chroma_scaling_idx" can use this tile group level default index to derive corresponding chroma scaling factor. In some embodiments, the chroma scaling factor of a small block can be inherited from its neighbors (e.g., top or left neighbors) who have explicitly signaled scaling factors.

Besides signaling this syntax element "lmcs_chroma_scaling_idx" at the CU level, it can also be signaled at the CTU level. However, given the maximum CTU size is 128×128 in VVC, doing the same scaling at the CTU level can be too coarse. Therefore, in some embodiments of this disclosure, this syntax element "lmcs_chroma_scaling_idx" can be signaled using fixed granularity. For example, for each 16×16 area in the CTU, one "lmcs_chroma_scaling_idx" is signaled and applied to all samples in that 16×16 area.

The range of "lmcs_chroma_scaling_idx" for the current tile group depends on a number of chroma scaling factor values that are allowed in the current tile group. The number of chroma scaling factor values allowed in the current tile group can be determined based on the 64-entry chroma LUT as discussed above. Alternatively, the number of chroma scaling factor values allowed in the current tile group can be determined using the chroma scaling factor calculation discussed above.

For example, in the "quantization" method, the value of LOG 2_n can be set to 2 (i.e., "n" is set to 4), and the codeword assignment of each piece in the piecewise linear model of the current tile group can be set as follows: {0, 65, 66, 64, 67, 62, 62, 64, 64, 64, 67, 64, 64, 62, 61, 0}. Then there are only 2 possible scaling factor values for the entire tile group, because any codeword value from 64 to 67 can have the same scaling factor value (1.0 in fractional precision), and any codeword values from 60 to 63 can have the same scaling factor value (60/64=0.9375 in factional precision). For the two end pieces that don't have any codeword assigned to them, the chroma scaling factor is set to 1.0 by default. Therefore, in this example, one-bit is sufficient to signal "lmcs_chroma_scaling_idx" for blocks in the current tile group.

Other than determining the number of possible chroma scaling factor values using the piecewise linear model, the encoder can signal a set of chroma scaling factor values at the tile group header. Then, at the block level, the chroma scaling factor value for a block can be determined using the set of chroma scaling factor values and the "lmcs_chroma_scaling_idx" value for the block.

CABAC coding can be applied to code "lmcs_chroma_scaling_idx." CABAC context of a block can depend on "lmcs_chroma_scaling_idx" of neighboring blocks of the block. For example, a block to the left or a block on top can be used to form the CABAC context. In terms of binarization of this syntax element of "lmcs_chroma_scaling_idx," the same truncated Rice binarization applied to ref_idx_l0 and ref_idx_l1 syntax elements in VVC draft 4 can be used to binarize "lmcs_chroma_scaling_idx."

The benefit of signaling the "chroma_scaling_idx" is that the encoder can select the best "lmcs_chroma_scaling_idx" in terms of rate distortion cost. Choosing the "lmcs_chroma_scaling_idx" using rate distortion optimization can improve coding efficiency, which could help to offset the signaling cost increase.

Embodiments of the disclosure further provide a method for processing video content with signaling of LMCS piecewise linear model.

Although the LMCS method uses a piecewise linear model with 16 pieces, a number of unique values of "SignaledCW[i]" in a tile group tends to be much less than 16. For example, some of the 16 pieces can use a default number of codewords "OrgCW," and some of the 16 pieces can have a same number of codewords as each other. Therefore, an alternative method of signaling the LMCS piecewise linear model can include signaling a number of unique codewords "listUniqueCW[ ]," and sending an index for each of the pieces to indicate an element of the "listUniqueCW[ ]" for a current piece.

The modified syntax table is provided in Table 6 of FIG. 12. In Table 6 of FIG. 12, the new or modified syntaxes are emphasized in italics and gray shading.

Semantics of the disclosed signaling method are as follows, with changes being underlined:

reshaper_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.

reshaper_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx−reshape_model_delta_max_bin_idx.

reshaper_model_bin_delta_abs_cw_prec_minus1 plus 1 specifies the number of bits used for the representation of the syntax reshape_model_bin_delta_abs_CW[i].

reshaper_model_bin_num_unique_cw_minus1 plus 1 specifies the size of the codeword array listUniqueCW.

reshaper_model_bin_delta_abs_CW[i] specifies the absolute delta codeword value for the i-th bin.

reshaper_model_bin_delta_sign_CW_flag[i] specifies the sign of reshape_modelbin_delta_abs_CW[i] as follows:
  If reshape_model_bin_delta_sign_CW_flag[i] is equal to 0, the corresponding variable RspDeltaCW[i] is a positive value.
  Otherwise (reshape_model_bin_delta_sign_CW_flag[i] is not equal to 0), the corresponding variable RspDeltaCW[i] is a negative value.

When reshape_model_bin_delta_sign_CW_flag[i] is not present, it is inferred to be equal to 0.

The variable RspDeltaCW[i] is derived as RspDeltaCW[i]=(1−2*reshape_model_bin_delta_sign_CW [i])*reshape_model_bin_delta_abs_CW [i]

The variable listUniqueCW[0] is set equal to OrgCW. The variable listUniqueCW[i] with i=1 . . . reshaper_model_bin_num_unique_cw_minus1, inclusive, is derived as follow:
  The variable OrgCW is set equal to $(1<<BitDepth_Y)/(MaxBinIdx+1)$.
  listUniqueCW [i]=OrgCW+RspDeltaCW[i−1]

reshaper_model_bin_cw_idx[i] specifies the index of the array listUniqueCW[ ] used to derive RspCW [i]. The value of reshaper_model_bin_cw_idx [i] shall be in the range of 0 to (reshaper_model_bin_num_unique_cw minus1+1), inclusive.

RspCW[i] is derived as follows:—
  If reshaper_model_min_bin_idx<=i<=reshaper_model_max_bin_idx
  RspCW[i]=listUniqueCW[reshaper_model_bin_cw_idx [i]].
  Otherwise, RspCW[i]=0.

The value of RspCW [i] can be in the range of 32 to 2*OrgCW−1 if the value of $BitDepth_Y$ is equal to 10.

Embodiments of the disclosure further provide a method for processing video content with conditional chroma scaling at the block level.

As shown in Table 1 of FIG. 6, whether chroma scaling is applied can be determined by the "tile_group_reshaper_chroma_residual_scale_flag" signaled at the tile group level.

However, it can be beneficial to determine whether to apply chroma scaling at the block level. For example, in some disclosed embodiments, a CU level flag can be signaled to indicate if chroma scaling is applied to the current block. Presence of the CU level flag can be conditioned upon the tile group level flag "tile_group_reshaper_chroma_residual_scale_flag." That is, the CU level flag can be signaled only if chroma scaling is allowed at the tile group level. While the encoder is allowed to choose whether to use chroma scaling based on whether the chroma scaling is beneficial for the current block, it can also incur significant signaling overhead.

Consistent with the disclosed embodiments, to avoid the above signaling overhead, whether chroma scaling is applied to a block or not can be conditioned upon a prediction mode of a block. For example, when the block is inter predicted, the prediction signal tends to be good, especially if its reference pictures are closer in temporal distance. Therefore, because the residual is expected to be very small, chroma scaling can be bypassed. For example, pictures in the higher temporal levels tend to have reference pictures that are close in temporal distance. And for blocks, in pictures that use nearby reference pictures, chroma scaling can be disabled. The picture order count (POC) difference between the current picture and the block's reference pictures can be used to determine if this condition is met.

In some embodiments, chroma scaling can be disabled for all inter coded blocks. In some embodiments, chroma scaling can be disabled for the combined intra/inter prediction (CIIP) mode, which is defined in the VVC standard.

In the VVC standard, the CU syntax structure "coding_unit( )" includes a syntax element "cu_cbf" to indicate if there is any non-zero residual coefficient in the current CU. At the TU level, the TU syntax structure "transform_unit( )" includes syntax elements "tu_cbf_cb" and "tu_cbf_cr" to indicate if there is any non-zero chroma (Cb or Cr) residual coefficients in the current TU. The chroma scaling process can be conditioned upon these flags. As explained above, the averaging of the corresponding luma chroma scaling process can be invoked if there is no non-zero residual coefficient. With the invoking of the averaging, the chroma scaling process can be bypassed.

Figure 13:
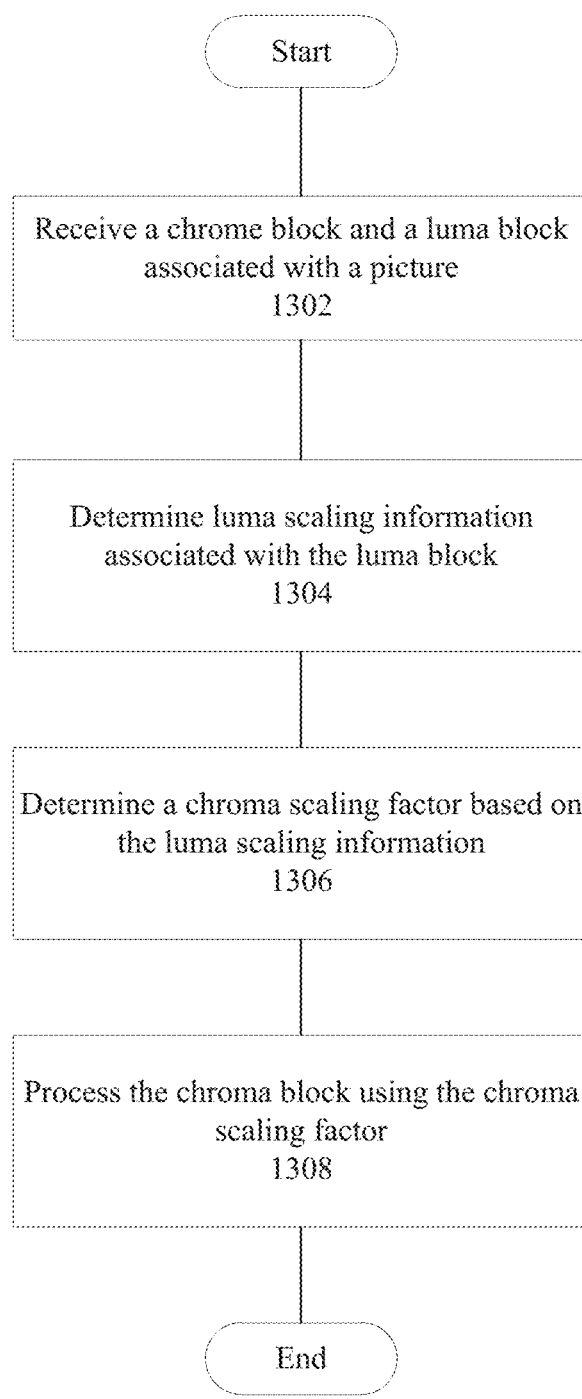
FIG. 13 is a flowchart of a method for processing video content, according to some embodiments of the disclosure.

FIG. 13 illustrates a flowchart of a computer-implemented method 1300 for processing video content. In some embodiments, method 1300 can be performed by a codec (e.g., an encoder in FIGS. 2A-2B or a decoder in FIGS. 3A-3B). For example, the codec can be implemented as one or more software or hardware components of an apparatus (e.g., apparatus 400) for encoding or transcoding a video sequence. In some embodiments, the video sequence can be an uncompressed video sequence (e.g., video sequence 202) or a compressed video sequence that is decoded (e.g., video stream 304). In some embodiments, the video sequence can be a monitoring video sequence, which can be captured by a monitoring device (e.g., the video input device in FIG. 4) associated with a processor (e.g., processor 402) of the apparatus. The video sequence can include multiple pictures. The apparatus can perform method 1300 at the level of pictures. For example, the apparatus can process one picture at a time in method 1300. For another example, the apparatus can process a plurality of pictures at a time in method 1300. Method 1300 can include steps as below.

At step 1302, a chroma block and a luma block associated with a picture can be received. It is appreciated that a picture can be associated with chroma components and a luma component. Thus, the picture can be associated with a chroma block containing the chroma samples and a luma block containing the luma samples.

At step 1304, luma scaling information associated with the luma block can be determined. In some embodiments, the luma scaling information can be syntax elements signaled in the data stream of the picture or variables derived based on the syntax elements signaled in the data stream of the picture. For example, the luma scaling information can include "reshape_model_bin_delta_sign_CW [i] and reshape_model_bin_delta_abs_CW[i]" described in the above equations, and/or "SignaledCW [i]" described in the above equations, and the like. In some embodiments, the luma scaling information can include a variable determined based on the luma block. For example, an average luma value that can be determined by calculating an average value of luma samples adjacent to the luma block (such as luma samples in a row on top of the luma block and in a column on the left of the luma block).

At step 1306, a chroma scaling factor can be determined based on the luma scaling information.

In some embodiments, a luma scaling factor of the luma block can be determined based on the luma scaling information. For example, according to the above equation of "inverse_chroma_scaling[i]=((1<<(luma_bit_depth−log 2(TOTAL_NUMBER_PIECES)+CSCALE_FP PREC))+(tempCW>>1))/tempCW," a luma scaling factor can be determined based on the luma scaling information (e.g., "tempCW"). Then the chroma scaling factor can be further determined based on a value of the luma scaling factor. For example, the chroma scaling factor can be set to be equal to the value of the luma scaling factor. It is appreciated that further calculation can be applied on the value of the luma scaling factor before being set as the chroma scaling factor. As another example, the chroma scaling factor can be set to be equal to "SignaledCW[$Y_{Idx}$]/OrgCW," wherein a piece index of the current chroma block "$Y_{Idx}$" can be determined based on an average luma value associated with the luma block.

At step 1308, the chroma block can be processed using the chroma scaling factor. For example, residuals of the chroma block can be processed using the chroma scaling factor, to generate scaled residuals of the chroma block. The chroma block can either be a Cb chroma component or a Cr chroma component.

In some embodiments, the chroma block can be processed if a condition is satisfied. For example, the condition can include a target coding unit associated with the picture having no non-zero residuals; or a target transform unit associated with the picture having no non-zero chroma residuals. The target coding unit having no non-zero residuals can be determined based on a value of a first coded block flag of the target coding unit. And the target transform unit having no non-zero chroma residuals can be determined based on values of a second coded block flag for a first component and a third coded block flag for a second component of the target transform unit. For example, the first component can be a Cb component, and the second component can be a Cr component.

It is appreciated that each step of method 1300 can be executed as an independent method. For example, the method for determining the chroma scaling factor described in step 1308 can be executed as an independent method.

Figure 14:
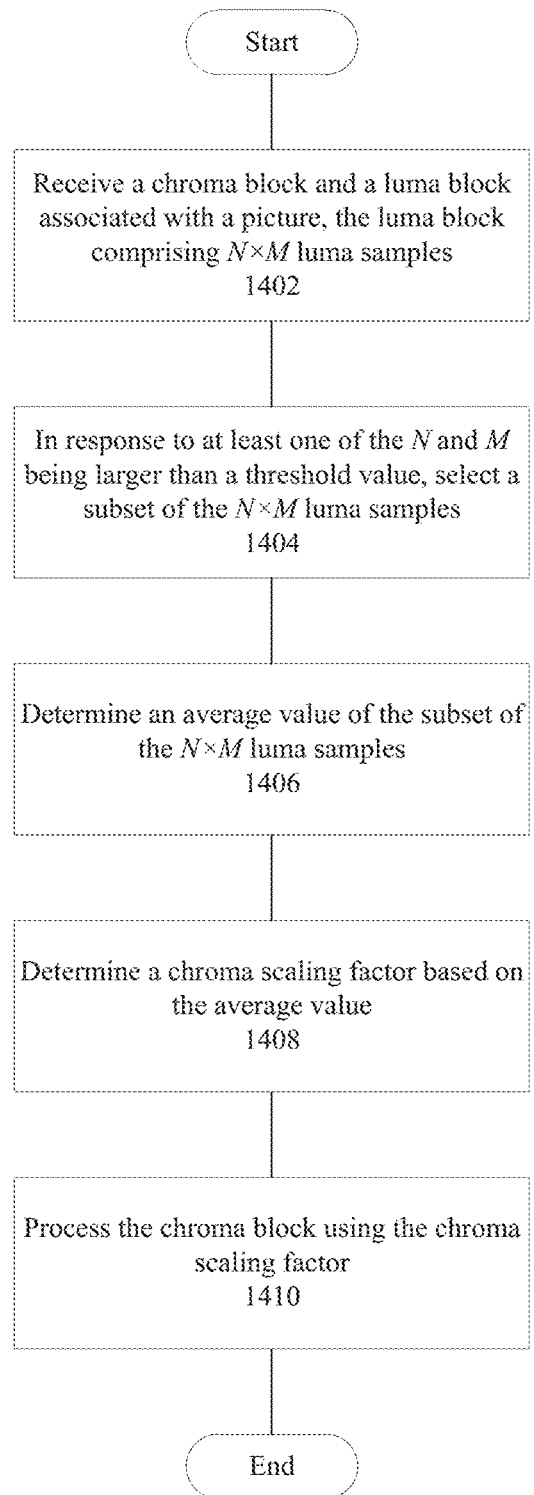
FIG. 14 is a flowchart of a method for processing video content, according to some embodiments of the disclosure.

FIG. 14 illustrates a flowchart of a computer-implemented method 1400 for processing video content. In some embodiments, method 1300 can be performed by a codec (e.g., an encoder in FIGS. 2A-2B or a decoder in FIGS. 3A-3B). For example, the codec can be implemented as one or more software or hardware components of an apparatus (e.g., apparatus 400) for encoding or transcoding a video sequence. In some embodiments, the video sequence can be an uncompressed video sequence (e.g., video sequence 202) or a compressed video sequence that is decoded (e.g., video stream 304). In some embodiments, the video sequence can be a monitoring video sequence, which can be captured by a monitoring device (e.g., the video input device in FIG. 4)

associated with a processor (e.g., processor 402) of the apparatus. The video sequence can include multiple pictures. The apparatus can perform method 1400 at the level of pictures. For example, the apparatus can process one picture at a time in method 1400. For another example, the apparatus can process a plurality of pictures at a time in method 1400. Method 1400 can include steps as below.

At step 1402, a chroma block and a luma block associated with a picture can be received. It is appreciated that a picture can be associated with chroma components and luma components. Thus, the picture can be associated with a chroma block containing the chroma samples and a luma block containing the luma samples. In some embodiments, the luma block can include N×M luma samples. N can be a width of the luma block and M can be a height of the luma block. As discussed above, luma samples of a luma block can be used to determine a piece index of a target chroma block. Thus, a luma block associated with a picture of a video sequence can be received. It is appreciated that N and M can have a same value.

At step 1404, in response to at least one of the N and M being larger than a threshold value, a subset of the N×M luma samples can be selected. To speed up the determination of the piece index, when a certain condition is met, the luma block can be "downsampled." In other words, a subset of the luma samples in the luma block can be used to determine the piece index. In some embodiments, the certain condition is at least one of the N and M being larger than a threshold value. In some embodiments, the threshold value can be based on at least one of the N and M. The threshold value can be a power of 2. For example, the threshold value can be 4, 8, 16, and the like. Taking 4 as an example, when N or M is greater than 4, a subset of the luma samples can be selected. In the example of FIG. 10, both the width and height of the luma block are greater than the threshold of 4, and thus, a subset of 4×4 samples are selected. It is appreciated that a subset of 2×8, 1×16, or the like can also be selected for processing.

At step 1406, an average value of the subset of the N×M luma samples can be determined.

In some embodiments, determining the average value can further include determining if a second condition is satisfied; and in response to the determination that the second condition is satisfied, determining the average value of the subset of the N×M luma samples. For example, the second condition can include a target coding unit associated with the picture having no non-zero residual coefficients; or the target coding unit having no non-zero chroma residual coefficients.

At step 1408, a chroma scaling factor based on the average value can be determined. In some embodiments, to determine the chroma scaling factor, a piece index of the chroma block can be determined based on the average value, whether the piece index of the chroma block satisfies a first condition can be determined, and then in response to the piece index of the chroma block satisfying the first condition, the chroma scaling factor can be set to a default value. The default value can indicate no chroma scaling is applied. For example, the default value can be 1.0 with fractional precision. It is appreciated that fixed point approximation can be applied on the default value. In response to the piece index of the chroma block not satisfying the first condition, the chroma scaling factor can be determined based on the average value. More particularly, the chroma scaling factor can be set to SignaledCW[$Y_{Idx}$]/OrgCW, and piece index of the target chroma block "$Y_{Idx}$" can be determined based on the average value of the corresponding luma block.

In some embodiments, the first condition can include the piece index of the chroma block being larger than a maximum index of signaled codewords or being smaller than a minimum index of the signaled codewords. The maximum index and the minimum index of signaled codewords can be determined as below.

Codewords can be generated using a piecewise linear model (e.g., LMCS) based on input signals (e.g., luma samples). As discussed above, a dynamic range of the input signals can be partitioned into several pieces (e.g., 16 pieces), and each piece of input signals can be used to generate a bin of codewords as output. Therefore, each bin of codewords can have a bin index corresponding to the piece of input signals. In this example, a range of the bin indices can be 0-15. In some embodiments, a value of the output (i.e., the codeword) is between a minimum value (e.g., 0) and a maximum value (e.g., 255), and a plurality of codewords having a value between the minimum value and the maximum value can be signaled. And bin indices of the signaled plurality of codewords can be determined. Among the bin indices of the signaled plurality of codewords, a maximum bin index and a minimum bin index of the signaled plurality of bins of codewords can be further determined.

In addition to the chroma scaling factor, method 1400 can further determine a luma scaling factor based on the signaled plurality of bins of codewords. The luma scaling factor can be used as an inversed chroma scaling factor. The equation for determining the luma scaling factor has been described above, and the description thereof is omitted herein. In some embodiments, a plurality of number of neighboring signaled codewords share the luma scaling factor. For example, two or four neighboring signaled codewords can share a same luma scaling factor, which can reduce the burden for determining the luma scaling factors.

At step 1410, the chroma block can be processed using the chroma scaling factor. As discussed above with reference to FIG. 5, a plurality of chroma scaling factors can construct a chroma scaling factor LUT at a tile group level, and be applied at a decoder side on the reconstructed chroma residual of a target block. Similarly, the chroma scaling factors can also be applied at an encoder side.

It is appreciated that each step of method 1400 can be executed as an independent method. For example, the method for determining the chroma scaling factor described in step 1308 can be executed as an independent method.

Figure 15:
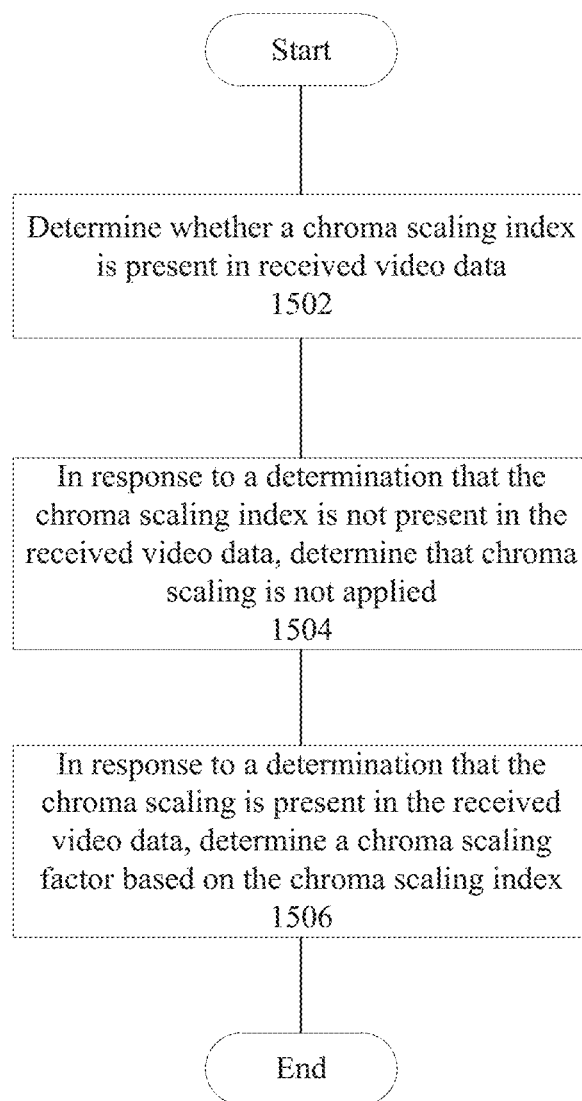
FIG. 15 is a flowchart of another method for processing video content, according to some embodiments of the disclosure.

FIG. 15 illustrates a flowchart of a computer-implemented method 1500 for processing video content. In some embodiments, method 1500 can be performed by a codec (e.g., an encoder in FIGS. 2A-2B or a decoder in FIGS. 3A-3B). For example, the codec can be implemented as one or more software or hardware components of an apparatus (e.g., apparatus 400) for encoding or transcoding a video sequence. In some embodiments, the video sequence can be an uncompressed video sequence (e.g., video sequence 202) or a compressed video sequence that is decoded (e.g., video stream 304). In some embodiments, the video sequence can be a monitoring video sequence, which can be captured by a monitoring device (e.g., the video input device in FIG. 4) associated with a processor (e.g., processor 402) of the apparatus. The video sequence can include multiple pictures. The apparatus can perform method 1500 at the level of pictures. For example, the apparatus can process one picture at a time in method 1500. For another example, the apparatus can process a plurality of pictures at a time in method 1500. Method 1500 can include steps as below.

At step 1502, whether a chroma scaling index is present in received video data can be determined.

At step 1504, in response to a determination that the chroma scaling index is not present in the received video data, it can be determined that chroma scaling is not applied to the received video data.

At step 1506, in response to a determination that the chroma scaling is present in the received video data, a chroma scaling factor can be determined based on the chroma scaling index.

Figure 16:
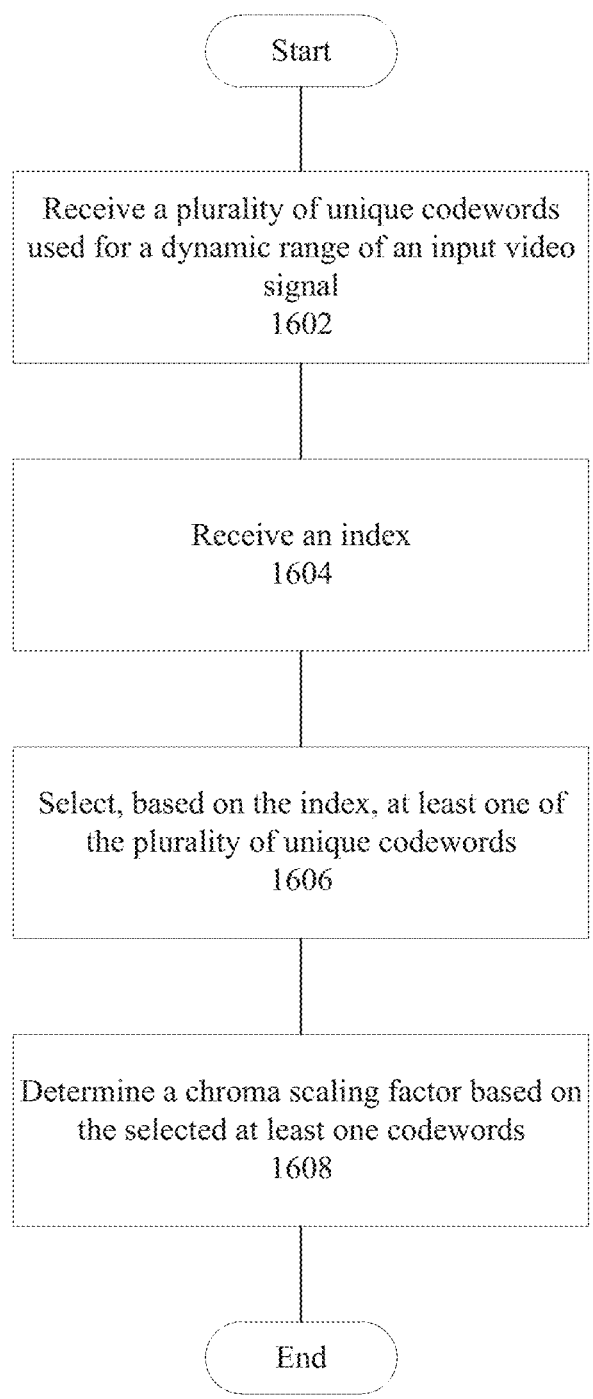
FIG. 16 is a flowchart of another method for processing video content, according to some embodiments of the disclosure.

FIG. 16 illustrates a flowchart of a computer-implemented method 1600 for processing video content. In some embodiments, method 1600 can be performed by a codec (e.g., an encoder in FIGS. 2A-2B or a decoder in FIGS. 3A-3B). For example, the codec can be implemented as one or more software or hardware components of an apparatus (e.g., apparatus 400) for encoding or transcoding a video sequence. In some embodiments, the video sequence can be an uncompressed video sequence (e.g., video sequence 202) or a compressed video sequence that is decoded (e.g., video stream 304). In some embodiments, the video sequence can be a monitoring video sequence, which can be captured by a monitoring device (e.g., the video input device in FIG. 4) associated with a processor (e.g., processor 402) of the apparatus. The video sequence can include multiple pictures. The apparatus can perform method 1600 at the level of pictures. For example, the apparatus can process one picture at a time in method 1600. For another example, the apparatus can process a plurality of pictures at a time in method 1600. Method 1600 can include steps as below.

At step 1602, a plurality of unique codewords used for a dynamic range of an input video signal can be received.

At step 1604, an index can be received.

At step 1606, at least one of the plurality of unique codewords can be selected based on the index.

At step 1608, a chroma scaling factor can be determined based on the selected at least one codewords.

In some embodiments, a non-transitory computer-readable storage medium including instructions is also provided, and the instructions can be executed by a device (such as the disclosed encoder and decoder) for performing the above-described methods. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The device can include one or more processors (CPUs), an input/output interface, a network interface, and/or a memory.

It is appreciated that the above-described embodiments can be implemented by hardware, or software (program codes), or a combination of hardware and software. If implemented by software, it can be stored in the above-described computer-readable media. The software, when executed by the processor, can perform the disclosed methods. The computing units and other functional units described in the present disclosure can be implemented by hardware, or software, or a combination of hardware and software. One of ordinary skill in the art will also understand that multiple ones of the above-described modules/units can be combined as one module/unit, and each of the above-described modules/units can be further divided into a plurality of sub-modules/sub-units.

The embodiments may further be described using the following clauses:

1. A computer-implemented method for processing video content, comprising:
   receiving a chrome block and a luma block associated with a picture;
   determining luma scaling information associated with the luma block;
   determining a chroma scaling factor based on the luma scaling information; and
   processing the chroma block using the chroma scaling factor.

2. The method according to clause 1, wherein determining the chroma scaling factor based on the luma scaling information further comprises:
   determining a luma scaling factor of the luma block based on the luma scaling information;
   determining the chroma scaling factor based on a value of the luma scaling factor.

3. The method according to clause 2, wherein determining the chroma scaling factor based on a value of the luma scaling factor further comprises:
   setting the chroma scaling factor equal to the value of the luma scaling factor.

4. The method according to any one of clauses 1-3, wherein processing the chroma block using the chroma scaling factor further comprises:
   determining if a first condition is satisfied; and
   performing one of
   in response to the determination that the first condition is satisfied, processing the chroma block using the chroma scaling factor; or
   in response to the determination that the first condition is not satisfied, bypassing the processing of the chroma block using the chroma scaling factor.

5. The method according clause 4, wherein the first condition comprises:
   a target coding unit associated with the picture having no non-zero residuals; or
   a target transform unit associated with the picture having no non-zero chroma residuals.

6. The method according clause 5, wherein
   the target coding unit having no non-zero residuals is determined based on a value of a first coded block flag of the target coding unit, and
   the target transform unit having no non-zero chroma residuals is determined based on values of a second coded block flag for a first chroma component and a third coded block flag for a second luma chroma component of the target transform unit.

7. The method of clause 6, wherein
   the value of the first coded block flag is 0; and
   the values of the second coded block flag and the third coded block flag are 0.

8. The method according to any one of clauses 1-7, wherein processing the chroma block using the chroma scaling factor comprises:
   processing residuals of the chroma block using the chroma scaling factor.

9. An apparatus for processing video content, comprising:
   a memory storing a set of instructions; and
   a processor coupled to the memory and configured to execute the set of instructions to cause the apparatus to perform:
   receiving a chrome block and a luma block associated with a picture;

determining luma scaling information associated with the luma block;

determining a chroma scaling factor based on the luma scaling information; and processing the chroma block using the chroma scaling factor.

10. The apparatus according to clause 9, wherein in determining the chroma scaling factor based on the luma scaling information, the processor is configured to execute the set of instructions to cause the apparatus to further perform:

determining a luma scaling factor of the luma block based on the luma scaling information;

determining the chroma scaling factor based on a value of the luma scaling factor.

11. The apparatus according to clause 10, wherein in determining the chroma scaling factor based on a value of the luma scaling factor, the processor is configured to execute the set of instructions to cause the apparatus to further perform:

setting the chroma scaling factor equal to the value of the luma scaling factor.

12. The apparatus according to any one of clauses 9-11, wherein in processing the chroma block using the chroma scaling factor, the processor is configured to execute the set of instructions to cause the apparatus to further perform:

determining if a first condition is satisfied; and performing one of in response to the determination that the second condition is satisfied, processing the chroma block using the chroma scaling factor; or in response to the determination that the second condition is not satisfied, bypassing the processing of the chroma block using the chroma scaling factor.

13. The apparatus according clause 12, wherein the first condition comprises:

a target coding unit associated with the picture having no non-zero residuals; or a target transform unit associated with the picture having no non-zero chroma residuals.

14. The apparatus according clause 13, wherein the target coding unit having no non-zero residuals is determined based on a value of a first coded block flag of the target coding unit, and the target transform unit having no non-zero chroma residuals is determined based on values of a second coded block flag for a first chroma component and a third coded block flag for a second chroma component of the target transform unit.

15. The apparatus of clause 14, wherein the value of the first coded block flag is 0; and the values of the second coded block flag and the third coded block flag are 0.

16. The apparatus according to any one of clauses 9-15, wherein in processing the chroma block using the chroma scaling factor, the processor is configured to execute the set of instructions to cause the apparatus to further perform:

processing residuals of the chroma block using the chroma scaling factor.

17. A non-transitory computer-readable storage medium storing a set of instructions that are executable by one or more processors of a device to cause the device to perform a method for processing video content, the method comprising:

receiving a chrome block and a luma block associated with a picture;

determining luma scaling information associated with the luma block;

determining a chroma scaling factor based on the luma scaling information; and processing the chroma block using the chroma scaling factor.

18. A computer-implemented method for processing video content, the method comprising:

receiving a chroma block and a luma block associated with a picture, the luma block comprising N×M luma samples;

in response to at least one of the N and M being larger than a threshold value, selecting a subset of the N×M luma samples;

determining an average value of the subset of the N×M luma samples;

determining a chroma scaling factor based on the average value; and processing the chroma block using the chroma scaling factor.

19. A computer-implemented method for processing video content, the method comprising:

determining whether a chroma scaling index is present in received video data;

in response to a determination that the chroma scaling index is not present in the received video data, determining that chroma scaling is not applied to the received video data; and in response to a determination that the chroma scaling is present in the received video data, determining a chroma scaling factor based on the chroma scaling index.

20. A computer-implemented method for processing video content, the method comprising:

receiving a plurality of unique codewords used for a dynamic range of an input video signal;

receiving an index;

selecting, based on the index, at least one of the plurality of unique codewords; and determining a chroma scaling factor based on the selected at least one codewords.

In addition to implementing the above method by using computer-readable program codes, the above method can also be implemented in a form of a logic gate, a switch, an ASIC, a programmable logic controller, and an embedded microcontroller. Therefore, such a controller can be considered as a hardware component, and apparatuses included in the controller and configured to implement various functions can also be considered as structures inside the hardware component. Or, the apparatuses configured to implement various functions can even be considered as both software modules configured to implement the method and structures inside the hardware component.

This disclosure can be described in a general context of a computer-executable instruction executed by a computer, for example, a program module. Generally, the program module includes a routine, a program, an object, an assembly, a data structure, a class, or the like used for executing a specific task or implementing a specific abstract data type. Embodiments of the disclosure can also be implemented in distributed computing environments. In the distributed computing environments, a task is executed by using remote processing devices connected through a communications network. In the distributed computing environments, the program module can be located in local and remote computer storage media, including a storage device.

It should be noted that the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as examples only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A computer-implemented method for processing video content, comprising:
   receiving a chroma block associated with a picture comprising a plurality of chroma samples;
   determining an averaged value of a plurality of luma samples in the picture; and
   determining a chroma scaling factor based on the averaged value,
   wherein the chroma scaling factor is used to process residuals of the chroma block,
   wherein the processing of the residues of the chroma block comprises:
      determining whether the chroma block has non-zero residuals; and
      in response to a determination that the chroma block has non-zero residuals, applying the chroma scaling factor to the residues of the chroma block.

2. The method according to claim 1, wherein whether the chroma block has non-zero residuals is determined based on a value of a coded block flag associated with the chroma block.

3. The method of claim 1, further comprising:
   in response to a value of a coded block flag associated with the chroma block is 1, determining that the chroma block has non-zero residuals.

4. An apparatus for processing video content, comprising:
   a memory storing a set of instructions; and
   a processor coupled to the memory and configured to execute the set of instructions to cause the apparatus to perform:
   receiving a chroma block associated with a picture comprising a plurality of chroma samples;
      determining an averaged value of a plurality of luma samples in the picture;
      determining a chroma scaling factor based on the averaged value; and
      processing residuals of the chroma block by applying the chroma scaling factor to the residuals of the chroma block,
   wherein in processing the residuals of the chroma block by applying the chroma scaling factor to the residuals of the chroma block, the processor is configured to execute the set of instructions to cause the apparatus to further perform:
      determining whether the chroma block has non-zero residuals; and
      in response to a determination that the chroma block has non-zero residuals, applying the chroma scaling factor to the residues of the chroma block.

5. The apparatus according to claim 4, wherein whether the chroma block has non-zero residuals is determined based on a value of a coded block flag associated with the chroma block.

6. The apparatus of claim 4, wherein the first condition comprises:
   in response to a value of a coded block flag associated with the chroma block is 1, determining that the chroma block has non-zero residuals.

7. A non-transitory computer-readable storage medium storing a set of instructions that are executable by one or more processors of a device to cause the device to perform a method for processing video content, the method comprising:
   receiving a chroma block associated with a picture comprising a plurality of chroma samples;
   determining an averaged value of a plurality of luma samples in the picture;
   determining a chroma scaling factor based on the averaged value; and
   processing residuals of the chroma block by applying the chroma scaling factor to the residuals of the chroma block,
   wherein the processing of the residues of the chroma block comprises:
      determining whether the chroma block has non-zero residuals; and
      in response to a determination that the chroma block has non-zero residuals, applying the chroma scaling factor to the residues of the chroma block.

8. The non-transitory computer-readable storage medium according to claim 7, wherein whether the chroma block has non-zero residuals is determined based on a value of a coded block flag associated with the chroma block.

9. The non-transitory computer-readable storage medium of claim 7, wherein the first condition comprises:
   in response to a value of a coded block flag associated with the chroma block is 1, determining that the chroma block has non-zero residuals.

10. The method according to claim 1, wherein the determining of the averaged value of the plurality of luma samples is triggered by a determination that a first condition is satisfied.

* * * * *